United States Patent [19]

Hibino

[11] Patent Number: 5,694,618

[45] Date of Patent: Dec. 2, 1997

[54] APPARATUS WHICH TRANSMITS A CHECK SIGNAL TO DETERMINE WHETHER A PRINTER IS CAPABLE OF BIDIRECTIONAL DATA TRANSMISSION AND REMOTELY SETTING THE PRINTER OPERATING ENVIRONMENT ACCORDINGLY

[75] Inventor: Masaaki Hibino, Yokkaichi, Japan

[73] Assignee: Brother Kogyo Kabushiki Kaisha, Aichi-ken, Japan

[21] Appl. No.: 461,929

[22] Filed: Jun. 5, 1995

[30] Foreign Application Priority Data

Jun. 6, 1994 [JP] Japan .................................. 6-148510

[51] Int. Cl.[6] ...................................................... G06F 13/00
[52] U.S. Cl. ........................... 395/866; 395/828; 395/834; 395/853; 395/882
[58] Field of Search ..................... 361/67; 395/114, 395/800, 828, 834, 853, 866, 882; 400/323

[56] References Cited

U.S. PATENT DOCUMENTS

| | | | |
|---|---|---|---|
| 3,708,050 | 1/1973 | McCarthy, Jr. ........................ | 400/323 |
| 4,379,327 | 4/1983 | Tietjen et al. ........................ | 395/550 |
| 4,386,416 | 5/1983 | Giltner et al. ........................ | 395/375 |
| 4,760,488 | 7/1988 | Kishimoto ............................ | 361/67 |
| 5,361,374 | 11/1994 | Sasaki et al. ........................ | 395/800 |
| 5,371,837 | 12/1994 | Kimber et al. ........................ | 395/114 |
| 5,388,089 | 2/1995 | Odaka et al. .......................... | 370/61 |

*Primary Examiner*—Thomas C. Lee
*Assistant Examiner*—Po C. Huang
*Attorney, Agent, or Firm*—Oliff & Berridge

[57] ABSTRACT

In a computer and a printer connected through a parallel interface called Centronics interface, after determining whether or not bidirectional transmission of data with the printer is possible, a printer setting device displays a message indicating the status or settings of the printer. An operator selects and sets the desired printer settings while viewing this display. On the other hand, when bidirectional transmission with the printer is not possible, predetermined default settings are set to the printer and the device displays the default settings. Therefore, the printer setting device can operate even when support for bidirectional transmission of data is not provided. Further, regardless of whether bidirectional transmission of data is possible, the operator can freely change the settings of the printer so that the functions of the printer can be more fully utilized.

20 Claims, 8 Drawing Sheets

APPARATUS WHICH TRANSMITS A CHECK SIGNAL TO DETERMINE WHETHER A PRINTER IS CAPABLE OF BIDIRECTIONAL DATA TRANSMISSION AND REMOTELY SETTING THE PRINTER OPERATING ENVIRONMENT ACCORDINGLY

BACKGROUND OF THE INVENTION

1. Field of the Invention

The present invention relates to a printer setting device that can set an operating environment of a printer connected to a host computer through bidirectionally communicable parallel interface known as Centronics interface to a host computer.

2. Description of the Related Art

A utility software installed in a personal computer can display the condition of the printer connected to the personal computer and set the operating conditions of the printer. Such a utility software is specifically designed for the personal computers that connect the printer through a bidirectionally communicable parallel interface known as Centronics interface.

However, the utility software is designed assuming that the Centronics interface allows bidirectional transmission of data between the printer and the personal computer. The utility software will not operate when a bidirectional transmission cannot be established between the printer and the personal computer because of a shortage of a signal transmission line in the side of the computer. Such an occurrence will yield when the personal computer is not completely compatible with a computer that supports the printer. The utility software will not operate either when a printer switching buffer provided between the printer and the personal computer does not have a bidirectional communication capability. In these cases, users cannot use the utility software.

SUMMARY OF THE INVENTION

It is an object of the present invention to overcome the above-described problems and provide a printing system that can change setting of the printer even when bidirectional transmission of data between the printer and a personal computer is impossible.

In order to achieve the above and other objects, there is provided, according to one aspect of the invention, a printing system configured by a host computer, a host computer connected to the host computer through a parallel data transmission interface known as Centronics interface, and a printer setting device. A printer setting information is set in the printer, which information includes a predetermined number of printer setting items and defines an operating environment of the printer. The printer is operated according to the printer setting information. The host computer has display means. The printer setting device includes transmission means for transmitting a bidirectional transmission check signal to the printer to investigate whether or not the printer is capable of performing bidirectional data transmission between the printer and the host computer. The printer transmits a response signal to the host computer in response to the bidirectional transmission check signal. The printer setting device further includes reception means for receiving the response signal from the printer, and determination means for determining whether or not bidirectional data transmission is possible therebetween based on the response signal received by the reception means. When the determination means determines that bidirectional data transmission therebetween is possible, the device receives from the printer the printer setting information set in the printer, displays the printer setting information received from the printer on the display means, and replaces the printer setting information with desired printer setting information. On the other hand, when the determination means determines that bidirectional data transmission is not possible, the device displays predetermined default setting information of the printer on the display means.

Further, the device can change settings in selected items of the printer setting information displayed on the display means, produce the desired printer setting information based on the changed settings, supply the desired printer setting information to the printer.

The device can also change selected settings in the predetermined default settings of the printer, produce modified printer setting information based on the changed default settings, and supply the modified printer setting information to the printer. The modified printer setting information is supplied to the printer so that the printer is operable according to the modified printer setting information.

A memory is provided for storing a first message and a second message to be separately displayed on the display means. The display means displays the first message to indicate that bidirectional data transmission is possible when the determination means determines that bidirectional data transmission is possible, and displays the second message to indicate that bidirectional data transmission is not possible when the determination means determines that bidirectional data transmission is not possible.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

A printer setting device according to a preferred embodiment of the present invention will be described while referring to the accompanying drawings.

Figure 1:
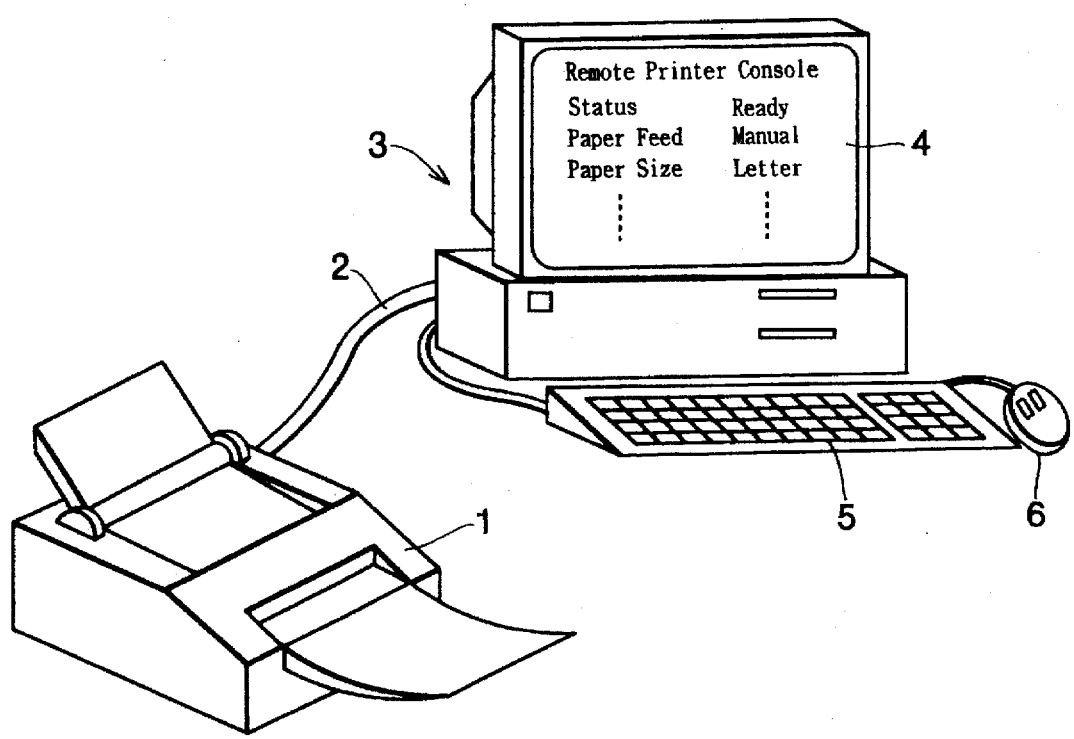
FIG. 1 is a perspective view showing a personal computer and a printer connected by a printer cable.

FIG. 1 shows a printer 1 connected to a personal computer 3 by a Centronics interface (I/F) 2. The personal computer 3 is provided with a display 4, a keyboard 5 for inputting data, and a mouse 6 for selection of one of various set items. The display 4 is for displaying screens with various information. For example, the display 4 displays menu screens with information on various modes (statuses) of the printer (for example, paper feed mode) and settings of the printer 1 that a user can change by operating the keyboard 5 or the mouse 6 while viewing the content of the screen displayed by the display 4.

Figure 2:
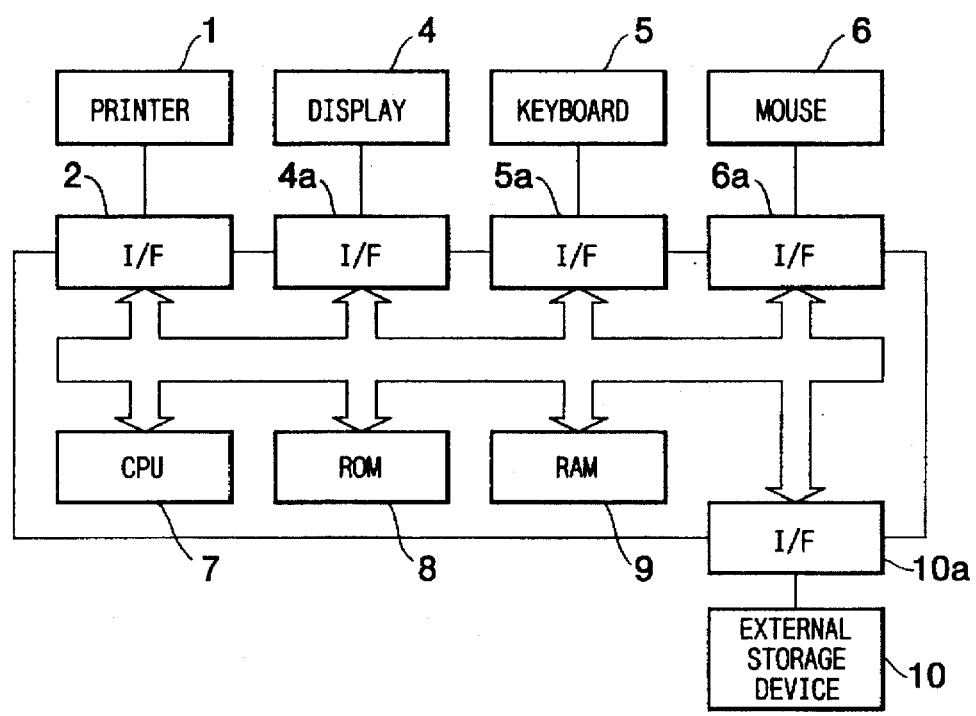
FIG. 2 is a block diagram showing connections of a personal computer with its peripheral equipments.

As shown in FIG. 2, the printer 1, display 4, keyboard 5, and the mouse 6 are connected to the personal computer 3 by the respective interfaces 2, 4a, 5a, and 6a. The interface 2 is a parallel interface known as Centronics interface. The personal computer 3 includes internal components such as a CPU 7 for controlling the personal computer 3, a ROM 8 storing various control programs including a remote printer console (to be described later), and a RAM 9 for temporarily storing data. The interfaces 2, 4a, 5a, and 6a, the CPU 7, the ROM 8, and the RAM 9 are connected to a data bus B. Also, an external storage device 10 such as a floppy drive for storing programs and other data is provided to the personal computer 3. The external storage device 10 is connected to the data bus B by an interface (I/F) 10a.

Figure 3:
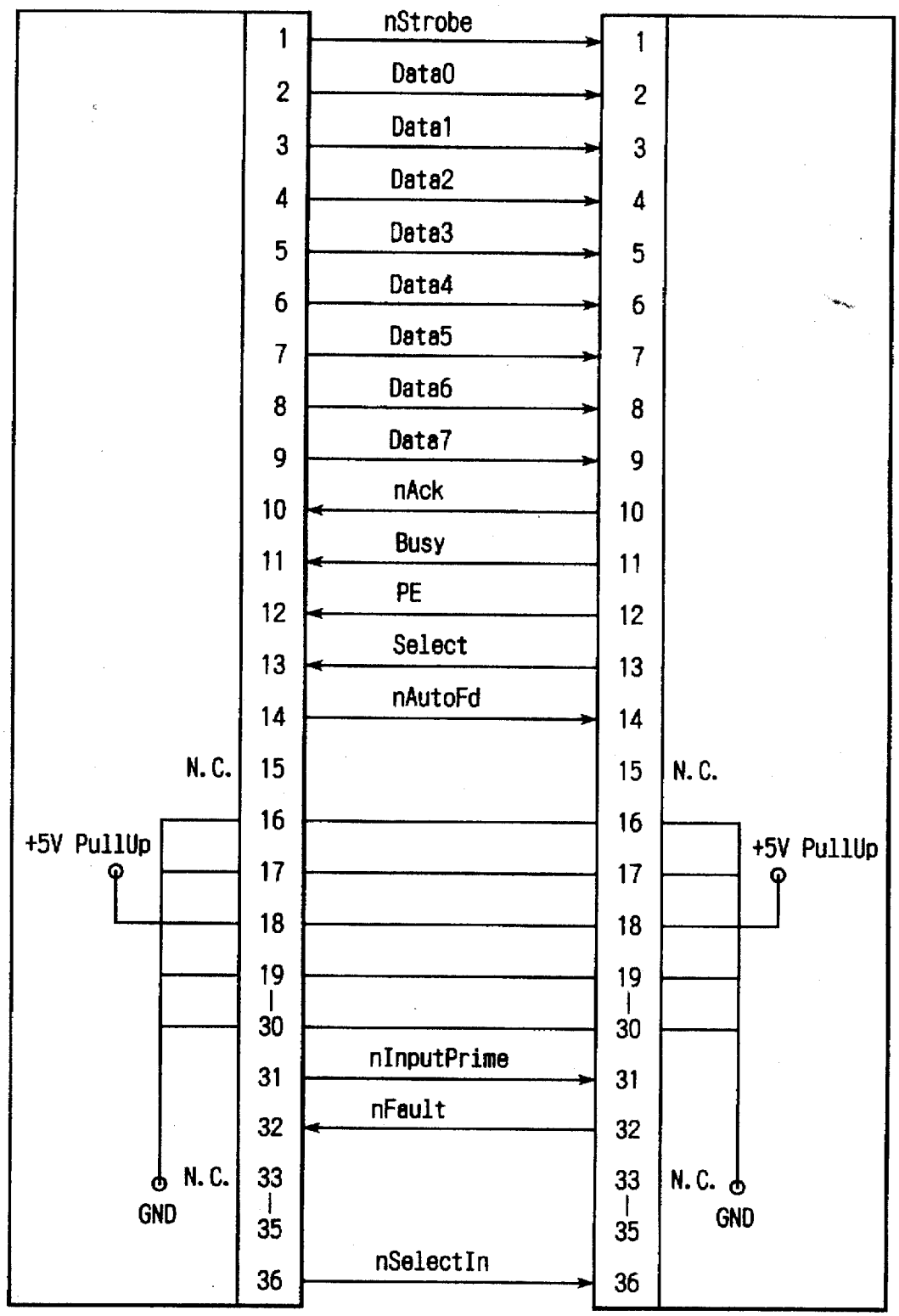
FIG. 3 is an explanatory diagram illustrating bidirectional transmission performed in normal mode on signal lines of Centronics interface connecting a printer and a personal computer.

FIG. 3 shows the signal lines when transmission between the personal computer 3 and the printer 1 is performed in normal mode, that is, compatibility mode, using Centronics interface 2 and shows the content of signals transmitted over the various signal lines. Negative logic signals are indicated in FIG. 3 proceeded by the letter "n" (for example, nStrobe signal is negative logic). The nStrobe signal starts transmission of data from the personal computer 3 to the printer 1. Eight bits of data are transmitted in parallel as Data0 through Data7 from the personal computer 3 to the printer 1 in each operation. An nAck (negative logic Acknowledge) signal and a Busy signal are for transmitting the condition of the printer 1 to the personal computer 3. That is, a low nAck signal indicates that the printer 1 has completed reception of data and is prepared for reception of further data. A high Busy signal indicates that the printer 1 is presently receiving data and cannot receive other data.

A PE (Paper End) signal indicates that there is no print sheet in the printer 1. A Select signal is for selecting the model of the printer 1. An nAutoFd (negative logic Auto Feed) signal indicates a command from the personal computer 3 for the printer 1 to automatically feed print sheets. An nInput Prime signal is a command from the personal computer 3 to the printer 1 to start initialization processes. An nFault signal is a signal from the printer 1 to the personal computer 3 indicating printer error. A low nFault signal indicates that no sheet is set in the printer 1, that the printer is off line, or that an error has been detected. An nSelectIn signal is a command to turn the power of the printer 1 off.

Figure 4:
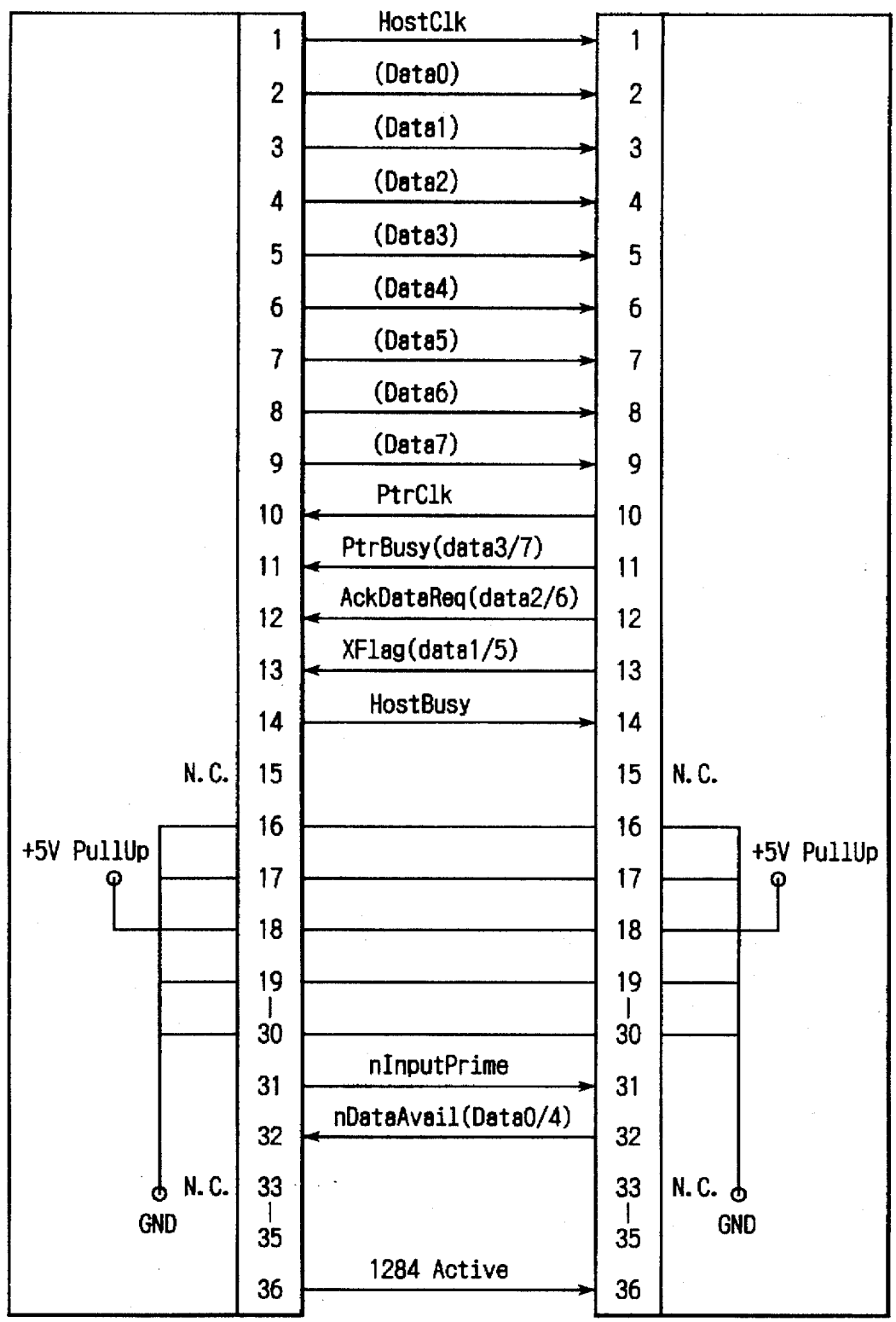
FIG. 4 is an explanatory diagram illustrating bidirectional transmission performed in data transfer phase on signal lines of Centronics interface connecting a printer and a personal computer.

FIG. 4 shows various transmissions of data between the printer 1 and the personal computer 3, for example, when the personal computer 3 is in a negotiation mode, that is, when the personal computer 3 is checking whether or not bidirectional transmission is possible between the printer 1 and the personal computer 3. The negotiation mode is also termed the nibble mode because each byte of data is transmitted from the printer 1 to the personal computer 3 in two successive transmissions of four bits each divided over four transmission lines (specifically pins 11 through 13 and pin 32 in this example).

Here, an example will be provided where data 0 through 7 are transmitted using the nibble mode. In this case, data 3 and 7 will be transmitted over the signal line connected to pin 11, data 2 and 6 will be transmitted over the signal line connected to pin 12, data 1 and 5 will be transmitted over the signal line connected to pin 13, and data 0 and 4 will be transmitted over the signal line connected to pin 32. The personal computer 3 can receive data from the printer 1 during the negotiation mode. Data can also be transmitted from the printer 1 to the personal computer 3 not only in the negotiation mode but also in a byte mode, which uses data line hardware that allows bidirectional transmission between the printer 1 and the personal computer 3.

Figure 5:
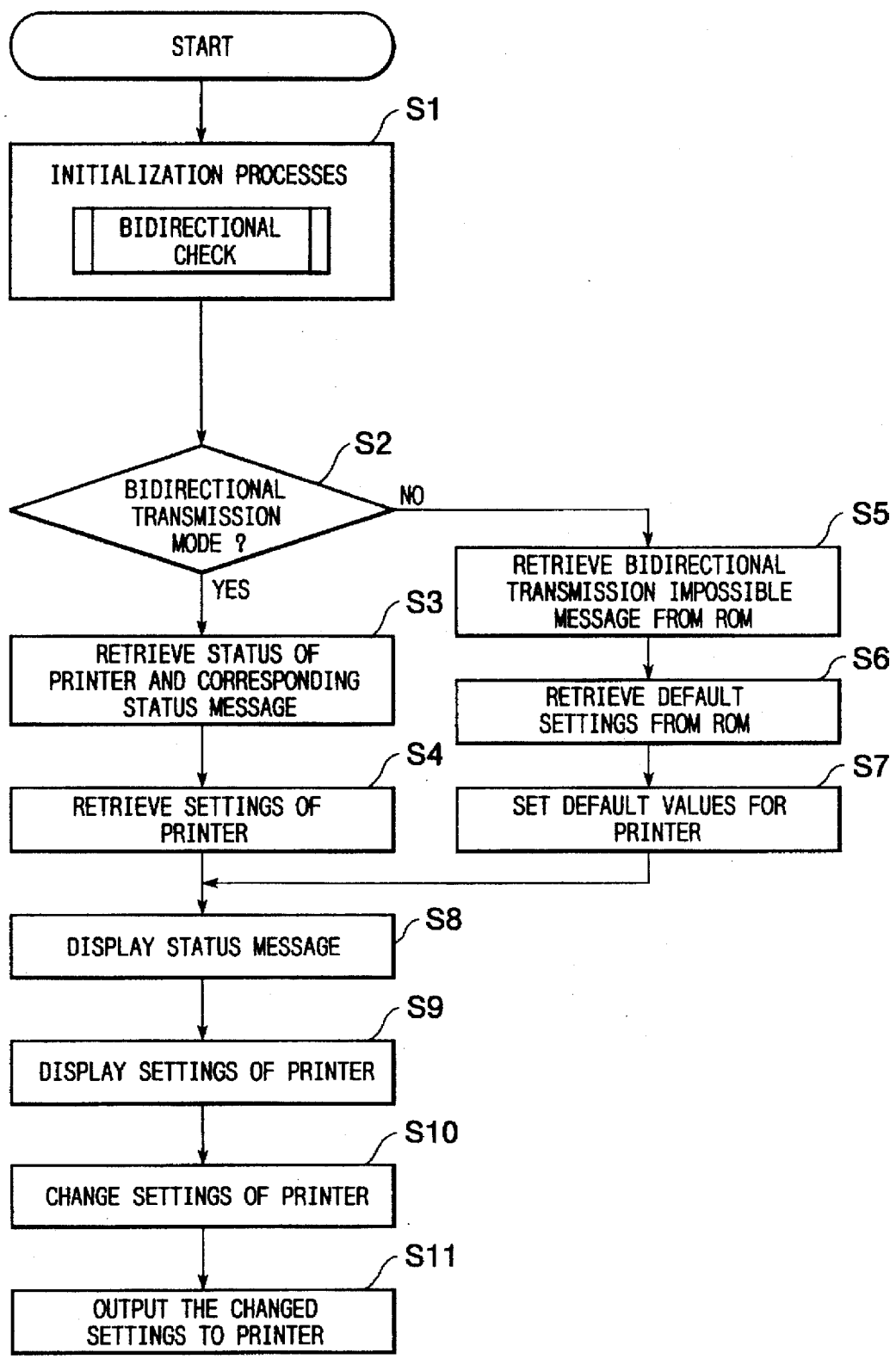
FIG. 5 is a flowchart illustrating a program of a utility software according to the present invention.

FIG. 5 shows a flowchart representing a utility program followed by the personal computer 3 to check capability of bidirectional transmission between the printer 1 and personal computer 3 and to set printer statuses. This utility program is called a remote printer console. When the personal computer 3 starts the utility program, the program retrieves information on the current printer status from the printer 1 and displays that information on the display 4. The utility program allows an operator to select and change on the display 4 those settings by using the keyboard 5 or the mouse 6.

When the utility program is first started, initialization processes are performed in the CPU 7 in step 1. (Hereinafter, steps will be referred to as Si wherein i is the number of the individual step.) During initialization processes, whether or not bidirectional transmission of data is possible between the printer 1 and the personal computer 3 is checked. Whether or not the check establishes that the printer is in a bidirectional transmission mode, that is, whether or not the printer 1 is potentially capable of bidirectional transmission, is determined in S2. If the check revealed that the printer 1 is in the bidirectional transmission mode (i.e., S2 is YES), the CPU 7 retrieves the status of the printer 1 from the printer 1 and a message corresponding to the retrieved status of the printer 1 from the ROM 8 in S3. The CPU 7 further retrieves the settings of the printer 1 from the printer 1 in S4. Then, in S8 and S9, the CPU 7 displays the status message and the settings of the printer 1 on the display 4 as shown in FIG. 9.

On the other hand, if the check in S2 discerns that the printer 1 is incapable of bidirectional transmission (i.e., S2 is NO), in S5 the CPU 7 retrieves from the ROM 8 a message indicating that bidirectional transmission is not possible, and again from the ROM 8 default settings of the printer 1 in S6. The CPU 7 sets the default values for the printer 1 in S7. Then, as shown in FIG. 11, the CPU 7 displays on the display 4, in S8, a message indicating that bidirectional transmission between the print 1 and the personal computer 3 is not possible and, in S9, the default values.

By viewing these messages, an operator can check several items on the status of the printer 1. By operating the keyboard 5 or the mouse 6, the user can change settings of the printer 1 in S10. Settings changed by the operator are outputted to the printer 1 in S11 and the printer 1 sets its operating environment accordingly.

Figure 9:
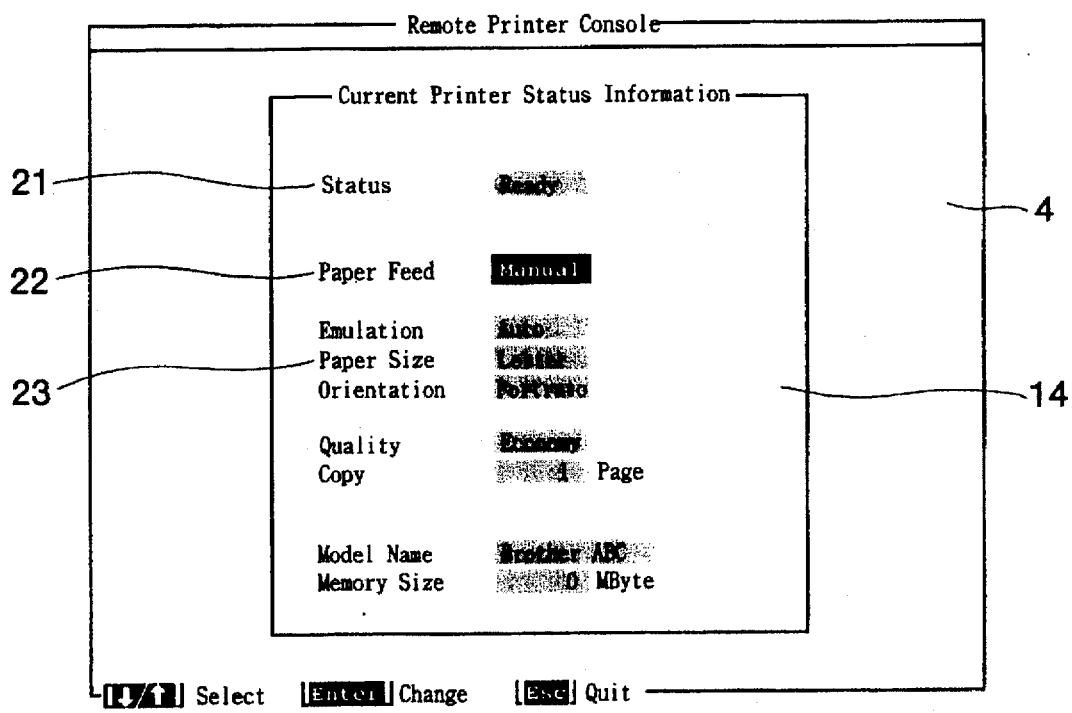
FIG. 9 shows an indication displayed on a display screen according to the utility software when a bidirectional mode is being set.
Figure 10:
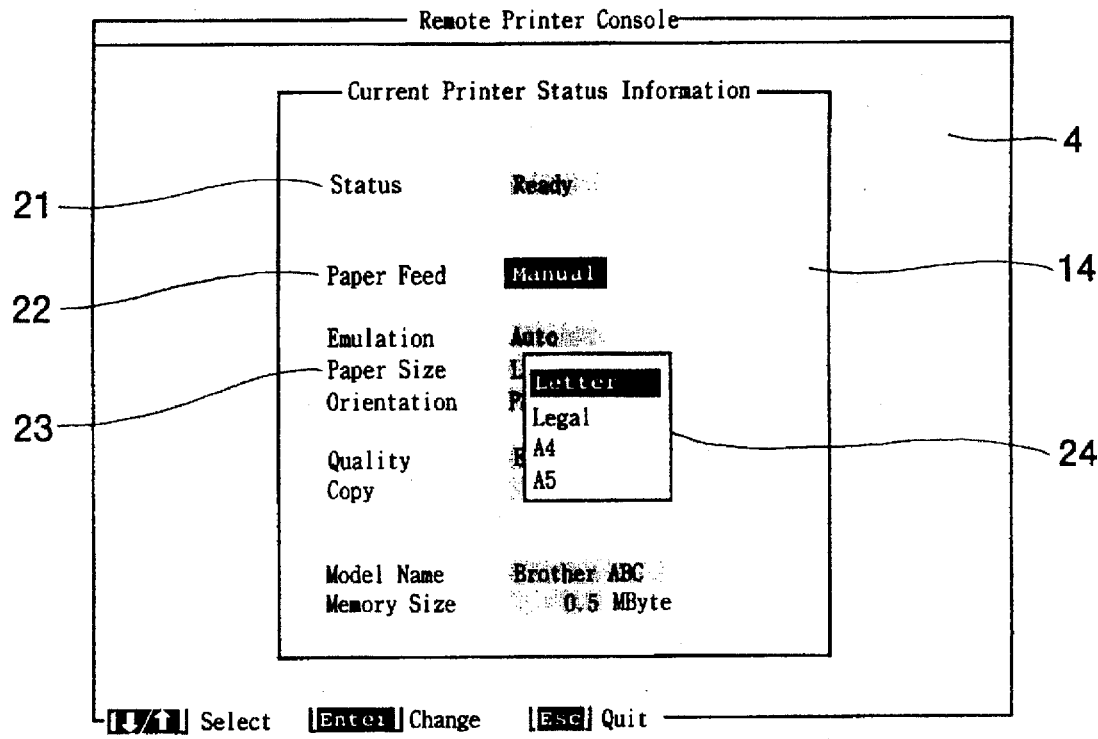
FIG. 10 shows an indication displayed on a display screen according to the utility software when a paper size is to be changed.
Figure 11:
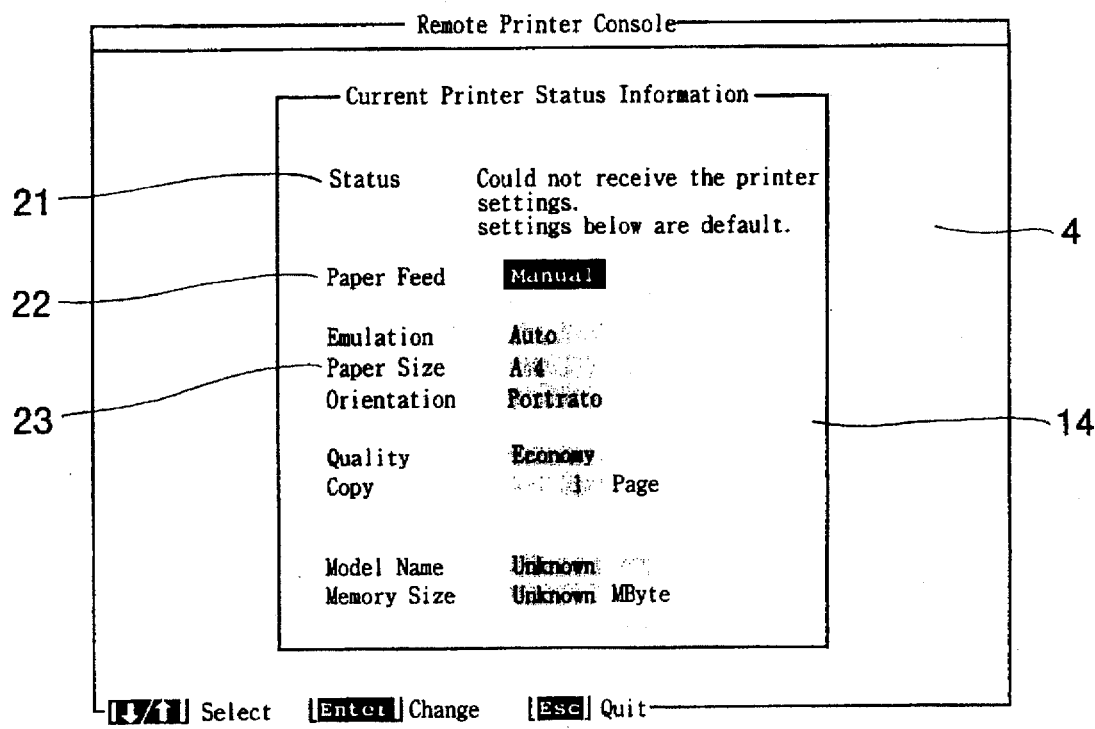
FIG. 11 shows an indication displayed on a display screen according to the utility software when modes other than the bidirectional mode are being set.

Next, a description of the above-described processes will be provided while referring to FIGS. 9 through 11. FIG. 9 shows a screen 14 displayed on the display 4 as a result of processes represented by S8 of the flowchart in FIG. 5. The screen 14 shows information relating to the current status of the printer 1. The screen 14 is divided into different categories showing information determined in the processes of S3 in the flowchart in FIG. 5. For example, the screen 14 shows a printer status category 21, a paper feed mode 22 category, and a paper size 23 category. In this example, the printer status category 21 reads "Ready," thereby indicating that the printer 1 is capable of bidirectional transmission. The paper feed mode category 22 reads "Manual," thereby indicating that the printer is in a manual feed mode. The paper size category 23 reads "Letter," thereby indicating that the printer 1 is set to print on letter-sized sheets. These messages "Ready", "Manual", and "Letter" are obtained from the printer 1 and correspond to settings displayed on the display 4 in S9 of the flowchart in FIG. 5. "Manual" is displayed in the paper feed mode category 22 in white on a black field to indicate that this setting is being selected and changeable using the keyboard 5 or the mouse 6.

An operator can select the paper size category 23 by manipulating the keyboard 5 or the mouse 6 while the display 4 is in this condition. In this case, a pull down menu 24 having the word "Letter" displayed in white on a black field will appear on the display 4 as shown in FIG. 10. The pull down menu 24 shows the different sizes of print sheets that the printer can print on. In this example, letter-, legal-, A4-, and A5-sheet sizes can be selected from using the pull-down menu 24. Setting changes selected by the operator are executed in the processes represented by S10 in the flowchart of FIG. 5. The changed settings are outputted to the printer 1 as shown in S11. Because in this example, the operator selected printing on letter-size sheets, "Letter" is displayed in white on a black field as shown in FIG. 10.

When it is determined that the printer 1 is incapable of bidirectional transmission (i.e., S2 is NO), the utility program start screen is displayed on the display 4 as shown in FIG. 11. The screen 14 indicating information relating to the current status of the printer 1 is displayed on the display 4. In the same manner as in the bidirectional mode, the screen 14 includes the printer status category 21, the paper feed mode category 22, the paper size category 23, and other categories on the status of the printer 1, but the values indicated in these categories are the default settings recorded beforehand in the ROM 8. The message "Could not receive the printer settings. Settings below are default." is displayed in the printer status category 21, indicating that the printer settings were set to default settings because settings can not be received from the printer 1. This message is generated and displayed in the processes represented by S5 of the flowchart of FIG. 5.

One default setting value obtained from the ROM 8 in S6 and displayed on the display 4 in S9 could set the sheet supply mode to automatically supply the printer 1 with sheets from a sheet tray filled with A4 sized-sheets. Such a setting value is reflected on the display 4 shown in FIG. 11 by the message "Tray" at the paper feed mode category 22 and the message "A4" at the paper size category 23. When the default settings are displayed on the display 4 by processes represented by S7 in FIG. 5, the displayed default settings are transmitted to and set in the printer 1 in order to match the displayed settings up with the settings of the printer 1. If the settings need to be changed, the operator can change them as shown in S10, whereupon the changed settings are outputted to the printer 1 in S11. As described above, when bidirectional transmission of data is not possible with the printer 1, the personal computer 3 can transmit settings for the operating environment of the printer 1 to the printer 1. Therefore, settings can be changed.

The above-described processes allow setting the printer 1 to predetermined default settings or to changed settings even when bidirectional transmission of data is not possible with the printer 1. Therefore, according to the present invention, the settings of the printer can be set even when bidirectional transmission of data is not supported. This contrast to conventional utility software, wherein settings of the printer cannot be changed using the personal computer when bidirectional transmission of data with the printer 1 is not possible. Additionally, regardless of whether or not bidirectional communication is possible with the printer 1, the settings of the printer 1 can be changed at the personal computer 3.

Figure 6:
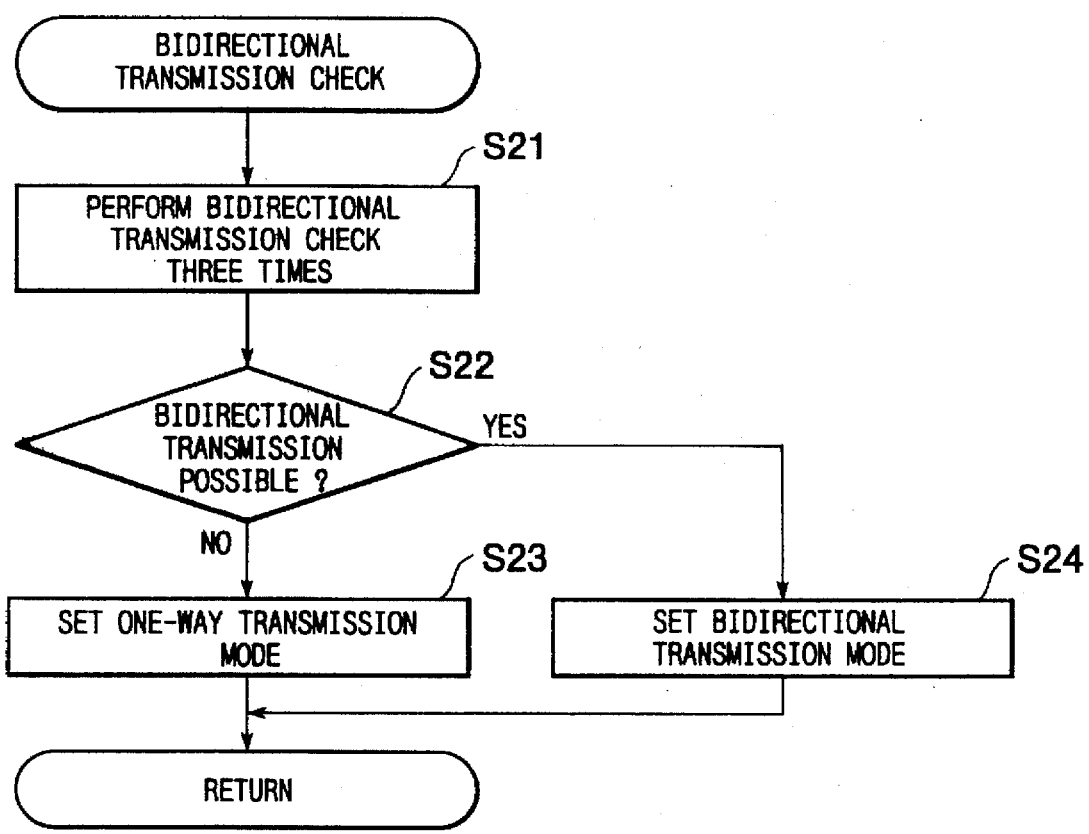
FIG. 6 is a flowchart illustrating a sequence of bidirectional checking process implemented when the utility software is run.

FIG. 6 shows a flowchart representing bidirectional check processes followed by the CPU 7 to check whether bidirectional transmission is possible. First, in S21, the CPU 7 checks whether bidirectional transmission between the printer 1 and the personal computer 3 is possible. The CPU 7 transmits a bidirectional transmission request command to the printer 1 and then checks whether or not the data received from the printer 1 is the correct response for the command. To increase accuracy of the bidirectional transmission check, the personal computer 3 sends the bidirectional transmission request command to the printer 1 three times. If the personal computer 3 receives correct data from the printer 1 three times, then it determines that bidirectional transmission is possible (i.e., S22 is YES), and so sets the bidirectional transmission mode in S24. On the other hand, if even once the personal computer 3 does not receive correct data from the printer 1, then it determines that bidirectional transmission is not possible (i.e., S22 is NO), and so sets the one-way transmission mode in S23.

Figure 7:
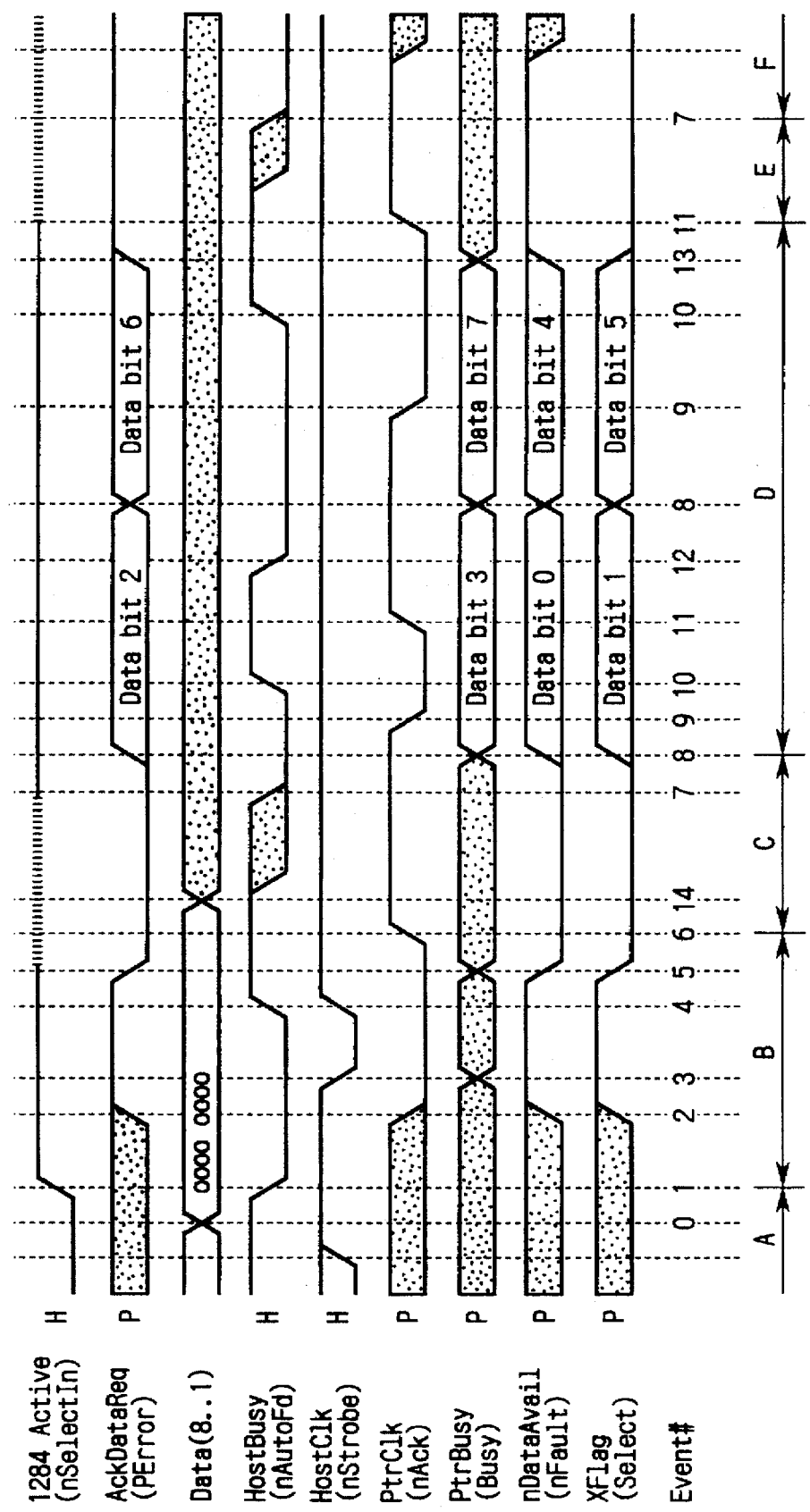
FIG. 7 is a time chart illustrating signal transmission/reception on various signal lines of Centronics interface.

FIG. 7 is a time chart showing transmission and reception status over each signal line of the Centronics interface 2. Signals outputted from the personal computer 3 are represented by the letter H (host computer) and signals outputted from the printer 1 are represented by the letter P. Region A indicates the normal mode, i.e., the compatibility mode; region B indicates the negotiation phase performed to check possibility of bidirectional transmission; region C indicates the host busy data valid phase indicating pre-transmission processes; region D indicates the data transmission phase for transmitting data from the printer 1 to the personal computer 3; region E indicates the host busy data invalid phase indicating post-transmission processes; and region F indicates a reverse idle phase showing data reception capability status of the personal computer 3.

During the negotiation phase of region B, the personal computer 3 transmits a bidirectional transmission request command to the printer 1 at timing of Event #1. If bidirectional transmission with the printer 1 is possible, the printer 1 responds to the personal computer 3 at timing of Event #2 by changing the level of the nAck signal from high to low, changing the level of the Select signal from low to high, and the like. At the timing of Events #3 and #4, the nStrobe signal turns low and the personal computer 3 outputs a response signal. At the timing of Event #6, the level of nAck signal changes from low to high. This completes the negotiation phase.

Next, during the negotiation phase of region B, when a correct response is not received from the printer 1, that is, when the level of nAck signal does not changed from high to low, it can be determined that the printer 1 is not supported with hardware capable of bidirectional transmission with the personal computer 3. Also, during the data transmission phase of region D, as mentioned above, one byte of data is divided into two transmissions of four bits each to the personal computer 3 over the signal lines connected to pins 11 through 13 and pin 32 of FIG. 4.

Figure 8:
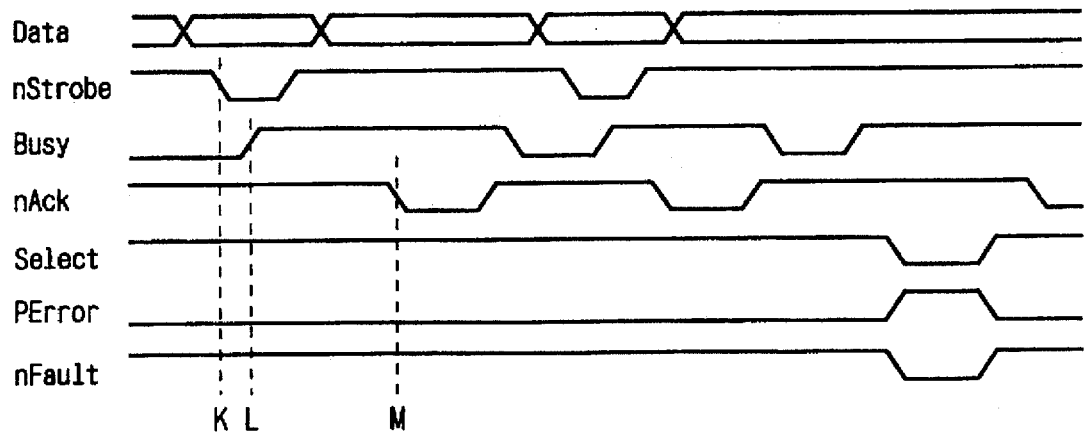
FIG. 8 is a time chart illustrating data transfer timings in the normal mode.

FIG. 8 is a time chart showing timing of data transmission operations during the normal mode. The Data and nStrobe signals are from the personal computer 3 and the Busy, nAck, and Select signals are from the printer 1. By the Data signal, the personal computer 3 transmits eight bits of data in parallel to the printer 1 in a single operation. When the nStrobe signal outputted from the personal computer 3 turns low at timing K, data transmission starts from the personal computer 3 to the printer 1, the Busy signal switches to high at timing L, and the printer 1 is unable to receive any data other than that described above. Afterward, when data reception of data from the personal computer 3 is complete, the nAck signal turns low at timing M so that the printer 1 can receive data. During data transmission, the Select signal for selecting the printer 1 is maintained in a high state. Also, when transmission is performed correctly during data transmission, printer error will not be detected, the PError signal is maintained constantly in a low state, and the nFault signal is maintained constantly in a high state.

While the invention has been described in detail with reference to specific embodiments thereof, it would be apparent to those skilled in the art that various changes and modifications may be made therein without departing from the spirit of the invention, the scope of which is defined by the attached claims.

For example, operations for setting the printer 1 need not be performed by a personal computer 3, but could instead be performed by a large-scale host computer or a special control panel for the printer 1. Also, the information relating to the present status of the printer 1 could be developed in many possible ways, not only by display on the screen 14.

What is claimed is:

1. A printer setting device connected to a printer, comprising:

transmission means for transmitting a bidirectional transmission check signal to the printer to investigate whether or not the printer is capable of performing bidirectional data transmission between the printer and a host computer, the printer transmitting a response signal in response to the bidirectional transmission check signal;

reception means for receiving the response signal from the printer;

determination means for determining whether or not bidirectional data transmission is possible therebetween based on the response signal received by said reception means;

display means;

first setting means operable when said determination means determines that bidirectional data transmission therebetween is possible, for receiving from the printer printer setting information set in the printer, the printer being operable according to the printer setting information, the printer setting information including a predetermined number of printer setting items representing an operating environment of the printer, for displaying the printer setting information on said display means, and for supplying the printer with desired printer setting information upon referring to the printer setting information displayed on the display means so that the printer is operable according to the desired printer setting information; and second setting means operable when said determination means determines that bidirectional data transmission is not possible, for displaying predetermined default settings of the printer on said display means.

2. A printer setting device according to claim 1, wherein said first setting means includes first changing means for changing settings in selected items of the printer setting information displayed on said display means.

3. A printer setting device according to claim 2, wherein said second setting means includes second changing means for changing selected settings in the predetermined default settings of the printer.

4. A printer setting device according to claim 3, wherein said second setting means supplies the printer with changed printer setting information so that the printer is operable according to the changed printer setting information.

5. A printer setting device according to claim 1, further comprising a memory for storing a first message and a second message to be separately displayed on said display means, and wherein said first setting means causes said display means to display the first message to indicate that bidirectional data transmission is possible when said determination means determines that bidirectional data transmission is possible, and wherein said second setting means causes said display means to display the second message to indicate that bidirectional data transmission is not possible when said determination means determines that bidirectional data transmission is not possible.

6. A printer setting device according to claim 1, wherein said transmission means transmits the bidirectional transmission check signal a plurality of times to the printer, and said determination means determines that bidirectional data transmission is possible therebetween based on the response signal transmitted from the printer each time when the bidirectional transmission check signal is transmitted to the printer.

7. A printer setting device according to claim 1, wherein the printer setting information includes information about paper used in the printer and information about printing condition.

8. A printing system comprising:

a printer in which a printer setting information is set wherein the printer setting information includes a predetermined number of printer setting items and defines an operating environment of the printer, the printer being operated according to the printer setting information;

a host computer having display means and a parallel data transmission interface, said host computer being connected to said printer through the parallel data transmission interface; and a printer setting device comprising:

transmission means for transmitting a bidirectional transmission check signal to said printer to investigate whether or not said printer is capable of performing bidirectional data transmission between said printer and said host computer, said printer transmitting a response signal in response to the bidirectional transmission check signal;

reception means for receiving the response signal from said printer;

determination means for determining whether or not bidirectional data transmission is possible therebetween based on the response signal received by said reception means;

first setting means operable when said determination means determines that bidirectional data transmission therebetween is possible, for receiving from said printer the printer setting information set in said printer, for displaying the printer setting information received from said printer on said display means, and for replacing the printer setting information with desired printer setting information; and second setting means operable when said determination means determines that bidirectional data transmission is not possible, for displaying predetermined default setting information of said printer on said display means.

9. A printing system according to claim 8, wherein said first setting means includes first changing means for changing settings in selected items of the printer setting information displayed on said display means, first producing means for producing the desired printer setting information based on the settings changed by said first changing means, and first supplying means for supplying the desired printer setting information to said printer.

10. A printing system according to claim 9, wherein said second setting means includes second changing means for changing selected settings in the predetermined default settings of said printer, second producing means for producing modified printer setting information based on the settings changed by said second changing means, and second supplying means for supplying the modified printer setting information to said printer.

11. A printing system according to claim 10, wherein said second supplying means supplies the printer with the modified printer setting information and replaces the predetermined default setting information with the modified setting information so that said printer is operable according to the modified printer setting information.

12. A printing system according to claim 8, further comprising a memory for storing a first message and a second message to be separately displayed on said display means, and wherein said first setting means causes said display means to display the first message to indicate that bidirectional data transmission is possible when said determination means determines that bidirectional data transmission is possible, and wherein said second setting means causes said display means to display the second message to indicate that bidirectional data transmission is not possible when said determination means determines that bidirectional data transmission is not possible.

13. A printing system according to claim 8, wherein said transmission means transmits the bidirectional transmission check signal a plurality of times to the printer, and said determination means determines that bidirectional data transmission is possible therebetween based on the response signal transmitted from the printer each time when the bidirectional transmission check signal is transmitted to the printer.

14. A printing system according to claim 8, wherein the printer setting information includes information about paper used in the printer and information about printing condition.

15. A printing system comprising:

a printer in which a printer setting information is set wherein the printer setting information includes a predetermined number of printer setting items and defines an operating environment of the printer, the printer being operated according to the printer setting information;

an external device having a parallel data transmission interface through which said printer is connected, said external device comprising:

display means; and control means having functions to transmit a bidirectional transmission check signal to said printer to investigate whether or not said printer is capable of performing bidirectional data transmission between said printer and said external device; to receive a response signal in response to the bidirectional transmission check signal from said printer; to determine whether or not bidirectional data transmission is possible therebetween based on the response signal; to receive, when bidirectional data transmission therebetween is possible, from said printer the printer setting information set in said printer; to display the printer setting information received from said printer on said display means; and to display, when bidirectional data transmission therebetween is not possible, predetermined default setting information of said printer on said display means.

16. A printing system according to claim 15, wherein said control means has further functions to replace the printer setting information with desired printer setting information and to replace the predetermined default setting information with a modified printer setting information.

17. A printing system according to claim 16, wherein said control means has further functions to change selected settings in the printer setting information displayed on said display means, to produce the desired printer setting information based on changed settings, and to supply the desired printer setting information to said printer.

18. A printing system according to claim 17, wherein said control means has further functions to change selected settings in the predetermined default settings of said printer, to produce the modified printer setting information based on changed settings of the predetermined default setting information, and to supply the modified printer setting information to said printer.

19. A printing system according to claim 18, wherein said control means has a further function to supply said printer with the modified printer setting information and replaces the predetermined default setting information with the modified setting information so that said printer is operable according to the modified printer setting information.

20. A printing system according to claim 15, wherein said external device further comprises a memory for storing a first message and a second message to be separately displayed on said display means, and wherein said control means causes said display means to display the first message to indicate that bidirectional data transmission is possible when said control means determines that bidirectional data transmission is possible, and wherein said control means causes said display means to display the second message to indicate that bidirectional data transmission is not possible when said control means determines that bidirectional data transmission is not possible.

* * * * *